J. T. PAGE.

Broiler.

No. 4,218. Reissued Dec. 27, 1870.

Witnesses.

W. A. Yeatman

C. L. Evert.

Inventor.

James T. Page per

Alexander Mason

Attys.

N. PETERS, Photo-Lithographer, Washington, D. C.

United States Patent Office.

JAMES T. PAGE, OF ROCHESTER, NEW YORK.

Letters Patent No. 106,280, dated August 9, 1870; reissue No. 4,218, dated December 27, 1870.

IMPROVEMENT IN BROILERS.

The Schedule referred to in these Letters Patent and making part of the same.

*To all whom it may concern:*

Be it known that I, JAMES T. PAGE, of the city of Rochester, in the county of Monroe and State of New York, have invented certain new and useful Improvements in the Construction of Meat-Broilers and Bread-Toasters; and do hereby declare the following to be a full, clear, and exact description thereof, reference being had to the accompanying drawing and to the letters of reference marked thereon.

The nature of my invention consists in the construction of the rim and the handle from a slight strip of sheet metal, with the ends forming the handle bent together and secured as shown, and provided with a wire grating.

Also, in the construction of the rim, with T-shaped slots or incisions in its upper or lower edge, for the reception of the wire which forms the bottom; and Furthermore, in combination therewith, the grooved rim or drip-pan, substantially as hereinafter described.

In order to enable others skilled in the art to which my invention appertains to make and use the same, I will now proceed to describe its construction and operation, referring to the annexed drawing which forms a part of this specification, and in which—

A represents the rim, made from a single strip of sheet metal, with the ends of the said strip lapped together and secured by rivets *g g* to form the handle *b*.

Figure 1:
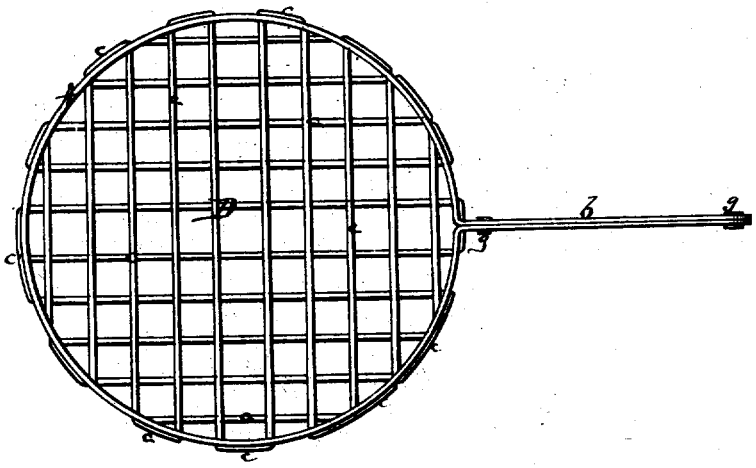
Figure 1 is a plan view of my device.
Figure 2:
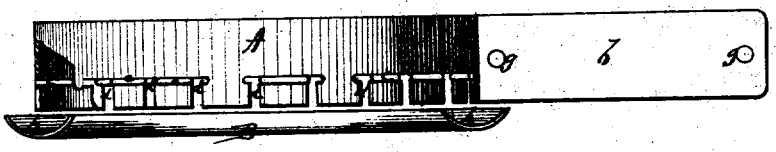
Figure 2 is a side view of the same slightly elevated from the drip-pan, which is shown in cross-section beneath.
Figure 3:
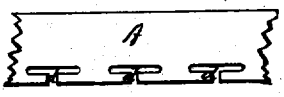
Figure 3 shows a section of the rim with the T-shaped slots or incisions.

In the top or bottom edge of the rim A I provide T-shaped slots or incisions *d d*, of about equal distance apart, and preferably of the form shown in fig. 3. These slots receive the wire-strands *c c* that are woven across from side to side of the rim, to form the wire-grating D on which the food rests.

I prefer to provide a drip-pan, B, having an annular groove, *h*, and an opening through the center, the pan B resting around the griddle-hole on top of the stove, so as to allow the rim A to rest therein.

By this means the grease or drippings that flow from the meat down the sides of the rim are caught in the groove *h* and prevented from besmearing the stove.

By construsting the rim A and the handle *b* of a single strip of sheet metal, as described, the articles can be made cheaper and more durable, and without the use of solder, which is liable to melt and to allow the seams to part.

If desired, a handle of wood or other suitable material may be provided by securing it to the handle *b*. Ordinarily the wire-bottom is made by weaving the wires across and drawing them through holes or perforations in the sides of the rim; but this process is laborious and expensive. By means of the T-shaped slots or incisions *d*, as in my device, the wire is inserted laterally into the edge of the rim, and the process of weaving the bottom is done much more rapidly and with less labor.

Having thus fully described my invention,

What I claim as new, and desire to secure by Letters Patent, is—

1. The rim A and handle *b*, made of a single piece of sheet metal, in combination with the wire-grating D, substantially as and for the purpose herein set forth.

2. The T-shaped slots or incisions *d d*, to receive the wire-strands *c c*, substantially as herein set forth.

3. In combination with the rim A and grating D, the drip-pan B, provided with the annular groove *h* and a central opening, substantially as and for the purposes herein set forth.

In testimony that I claim the foregoing I have hereunto set my hand this 14th day of November, 1870.

JAMES T. PAGE.

Witnesses:

GEO. P. DRAPER,
WM. BAILEY.